United States Patent
Takeshima et al.

(10) Patent No.: US 8,288,310 B2
(45) Date of Patent: Oct. 16, 2012

(54) AUTOMOBILE EXHAUST GAS PURIFICATION CATALYST AND METHOD OF PRODUCTION OF SAME

(75) Inventors: Shinichi Takeshima, Numazu (JP); Akio Koyama, Yokohama (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 172 days.

(21) Appl. No.: 12/513,171

(22) PCT Filed: Nov. 1, 2007

(86) PCT No.: PCT/JP2007/071671
§ 371 (c)(1),
(2), (4) Date: May 1, 2009

(87) PCT Pub. No.: WO2008/054026
PCT Pub. Date: May 8, 2008

(65) Prior Publication Data
US 2010/0069232 A1    Mar. 18, 2010

(30) Foreign Application Priority Data
Nov. 1, 2006 (JP) ................... 2006-297571

(51) Int. Cl.
*B01J 23/00* (2006.01)
*B01J 21/00* (2006.01)
(52) U.S. Cl. .............. 502/326; 502/349; 502/439
(58) Field of Classification Search .......... 502/327, 502/349, 439, 326
See application file for complete search history.

(56) References Cited

U.S. PATENT DOCUMENTS

| | | | | |
|---|---|---|---|---|
| 5,334,570 A | * | 8/1994 | Beauseigneur et al. | 502/304 |
| 5,516,714 A | * | 5/1996 | Kim | 438/60 |
| 5,607,892 A | * | 3/1997 | Chopin et al. | 502/304 |
| 5,786,294 A | * | 7/1998 | Sachtler et al. | 502/349 |
| 5,945,369 A | * | 8/1999 | Kimura et al. | 502/304 |

(Continued)

FOREIGN PATENT DOCUMENTS
EP            1 563 893           8/2005
(Continued)

OTHER PUBLICATIONS

Notice of Reasons for Rejection for JP Appl. No. 2008-198825 dated Apr. 26, 2011.

(Continued)

*Primary Examiner* — Cam N. Nguyen
(74) *Attorney, Agent, or Firm* — Finnegan, Henderson, Farabow, Garrett & Dunner, LLP

(57) ABSTRACT

An automobile exhaust gas purification catalyst comprised of a support mainly comprised of $ZrO_2$ in which Rh is supported as a catalyst metal preventing sintering of the support, raising the supporting efficiency, and raising the low temperature activity and a method of production of the same are provided. An automobile exhaust gas purification catalyst comprised of a support mainly comprised of $ZrO_2$, sintered under firing conditions where the as fired $ZrO_2$ will substantially not be charged in a catalyst metal supporting treatment solution, in which Rh is supported as a catalyst metal in a particle state. The method of production includes a step of charging the support mainly comprised of $ZrO_2$ fired under the above firing conditions by applying at least one treatment of an acid treatment and a base treatment and a step of dipping the charged state support in the catalyst supporting treatment solution including a colloid of Rh as the catalyst metal to make the Rh colloid be adsorbed on the support.

4 Claims, 3 Drawing Sheets

U.S. PATENT DOCUMENTS

| | | | |
|---|---|---|---|
| 7,314,846 B2 * | 1/2008 | Kuno | 502/326 |
| 7,446,076 B2 * | 11/2008 | Miyoshi et al. | 502/326 |
| 7,569,512 B2 * | 8/2009 | Weissman | 502/325 |
| 7,713,908 B2 * | 5/2010 | Yamamoto et al. | 502/300 |
| 7,867,943 B2 * | 1/2011 | Takeshima | 502/327 |
| 2007/0167319 A1 * | 7/2007 | Shiratori et al. | 502/304 |
| 2007/0225159 A1 * | 9/2007 | Ibe et al. | 502/304 |

FOREIGN PATENT DOCUMENTS

| | | |
|---|---|---|
| FR | 2 866 871 | 9/2005 |
| JP | 4-135641 | 5/1992 |
| JP | 4-166228 | 6/1992 |
| JP | 4-219140 | 8/1992 |
| JP | 2000-279818 | 10/2000 |
| JP | 2000-279824 | 10/2000 |
| JP | 2000-301000 | 10/2000 |
| JP | 2002-282692 | 10/2002 |
| JP | 2004-82000 | 3/2004 |
| JP | 2004-261641 | 9/2004 |
| JP | 2005-279435 | 10/2005 |
| JP | 2005-296733 | 10/2005 |
| JP | 2006-55748 | 3/2006 |
| JP | 2006-68665 | 3/2006 |
| JP | 2006-81957 | 3/2006 |
| JP | 2006-137651 | 6/2006 |
| JP | 2008-284553 | 11/2008 |
| KR | 2006-113779 | 11/2006 |
| WO | WO 99/32223 | 7/1999 |
| WO | WO 2005/082782 A2 | 9/2005 |

OTHER PUBLICATIONS

Extended European Search Report for EP Appl. No. 07831402.8 dated Jun. 14, 2011.

* cited by examiner

AUTOMOBILE EXHAUST GAS PURIFICATION CATALYST AND METHOD OF PRODUCTION OF SAME

CROSS-REFERENCE TO RELATED APPLICATIONS

This application is a national phase application of International Application No. PCT/JP2007/071671, filed Nov. 1, 2007, and claims the priority of Japanese Application No. 2006-297571, filed Nov. 1, 2006, the contents of both of which are incorporated herein by reference.

TECHNICAL FIELD

The present invention relates to an automobile exhaust gas purification catalyst raised in low temperature activity and a method of production of the same.

BACKGROUND ART

As an automobile exhaust gas purification catalyst, a three-way catalyst simultaneously oxidizing the CO and HC in exhaust gas and reducing NOx at a stoichiometric air-fuel ratio is being used for purification. As a three-way catalyst, for example, a heat resistant base member comprised of cordierite etc. on the surface of which a coat layer made of γ alumina is formed and supporting on the coat layer platinum Pt, rhodium Rh, palladium Pd, or another precious metal is widely known.

A three-way catalyst for exhaust gas purification of a gasoline engine, in particular a start catalyst arranged near the engine, has to be improved in low temperature activity the most among three-way catalysts since the HC and NOx exhausted at the time of cold start account for about 80% of the emissions.

However, up until now, no specific means for raising the low temperature activity have been known, so the practice had been to increase the supported amount or strengthen the insulation of the exhaust pipe to meet emission controls.

Here, among the HC and NOx accounting for the majority of the exhaust at the time of cold start, Rh has a high purification performance of NOx. Further, the purification of HC has an integral relationship with the purification of NOx in a three-way catalyst reaction mechanism.

Therefore, by using Rh, improvement of the low temperature activity may be expected.

However, in the case of Rh, it is not possible to use alumina ($Al_2O_3$) as a support like with Pt or Pd. This is because, as known in the past from C. Wong and R. W. McCabe, Journal of Catalysis, 119, 47-64 (1989) etc., in Rh/γ alumina systems etc., the Rh becomes solid solute in the alumina support in an oxidizing atmosphere and conversely precipitates in a reducing atmosphere, so cannot be stably maintained as a catalyst. This is because rhodium oxide ($Rh_2O_3$) has a corundum type crystal structure the same as α alumina, so easily becomes solid solute in alumina.

For this reason, as disclosed in Japanese Patent Publication (A) No. 4-219140 etc., zirconia ($ZrO_2$), which differs from $Rh_2O_3$ in crystal structure and will not become solid solute, has been used as a support to improve the low temperature activity and improve the durability.

However, Rh is extremely expensive, so for broader application, there was the problem that it was necessary to greatly reduce the amount of catalyst metal.

Further, Rh will not become solid solute in zirconia, but the zirconia itself easily sinters at the usage temperature of the catalyst, so in the end, degradation as a catalyst was also unavoidable.

Zirconia easily sinters because supporting Rh in a high temperature sintered zirconia is difficult, so to secure the supporting property of Rh, it was necessary to use low temperature sintered zirconia. For example, Japanese Patent Publication (A) No. 2002-282692 shows a method of adding La etc. to $ZrO_2$ and supporting Rh on a support sintered at 500° C. by the ion adsorption method.

However, the exhaust temperature rises to 800° C. or more during automobile operation. According to experiments by the inventors, a zirconia support sintered at about 500° C. had an initial surface area of 100 $m^2/g$, but fell to 40 $m^2/g$ when the highest temperature reached 800° C. or to 30 $m^2/g$ when the highest temperature reached 900° C. The zirconia particle size (average size) became coarser compared with the initial state 8 nm—reaching 25 nm after reaching 800° C. and 33 nm after reaching 900° C. Therefore, the problem of the sintering of the zirconia as an Rh support is derived from the fact that it is difficult to support Rh on high temperature sintered zirconia.

Further, a catalyst supporting Rh as ions by adsorption had the problem of deterioration of the activity compared with a catalyst supporting the same as particles.

To deal with this, various methods for supporting precious metals as colloids with higher activity than ions have been proposed in the past.

Japanese Patent Publication (A) No. 2000-279818 and Japanese Patent Publication (A) No. 2000-279824 disclose methods of supporting previous metals as polymer chelate metal colloids. While an adsorption method, tens of hours are required for supporting them. Further, with the sole practical PVP colloid, the supporting efficiency was a low one of about 30% and the improvement in performance was small.

Japanese Patent Publication (A) No. 2005-296733 discloses the method of using a metal colloid comprised of a protective agent and a catalyst metal to support a precious metal on a support by evaporation to dryness. However, with this method, basically the supporting density falls. Further, evaporation to dryness is used to secure the supporting ability. In the final analysis, there was no great difference from the methods of Japanese Patent Publication (A) No. 2000-279818 and Japanese Patent Publication (A) No. 2000-279824.

Further, a catalyst supporting a precious metal as a polymer stabilized metal colloid like the above is better in initial performance and more advantageous in durability in some respects as well compared with a catalyst supporting a precious metal by the impregnation method used in the past, but in the final analysis, there was the defect that under tough durability test conditions, the performance dropped compared with a catalyst supported by impregnation.

That is, a polymer stabilized colloid is dispersed as a colloid by the hydrophilic groups of the polymer. While the individual colloid particles may be small, a large number of colloid particles agglomerate to form large secondary particles. If evaporating these to dryness, they are supported as coarse secondary particles. Under a high temperature durability test, large sintering occurs. Compared with the time of impregnation, while the initial performance may be good, under a high temperature durability test, the performance drops and the superiority is substantially lost.

Furthermore, Japanese Patent Publication (A) No. 2004-82000 discloses a method of supporting a composite metal colloid having a center part of a precious metal and a surface part of a transition metal other than a precious metal by evaporation to dryness. In this method, the stability of a colloid such as a polymer stabilized colloid cannot be obtained. Further, problems similar to Japanese Patent Publication (A) No. 2000-279818, Japanese Patent Publication (A) No. 2000-279824, and Japanese Patent Publication (A) No. 2005-296733 using evaporation to dryness cannot be avoided.

Japanese Patent Publication (A) No. 2005-279435 discloses a method of adding a basic salt of La etc. to an acidic Rh+ZrO$_2$ solution, reducing and making the Rh precipitate and evaporating to dryness the result to support the precious metal, and suppressing sintering by the crystal lattice of Rh matching the crystal lattice of the support. Even with this method, problems similar to Japanese Patent Publication (A) No. 2000-279818, Japanese Patent Publication (A) No. 2000-279824, and Japanese Patent Publication (A) No. 2005-296733 using evaporation to dryness cannot be avoided.

In this way, up to now, there was the problem that the method of supporting a precious metal as colloid particles was low in supporting efficiency.

DISCLOSURE OF THE INVENTION

The present invention has as its object the provision of an automobile exhaust gas purification catalyst comprised of a support mainly comprised of ZrO$_2$ in which Rh is supported as a catalyst metal preventing sintering of the support, raising the supporting efficiency, and raising the low temperature activity, and a method of production of the same.

To achieve the above object, according to the present invention, there is provided an automobile exhaust gas purification catalyst comprised of a support mainly comprised of ZrO$_2$, sintered under sintering conditions where the as sintered ZrO$_2$ will substantially not be charged in a catalyst metal supporting treatment solution, in which Rh is supported as a catalyst metal in a particle state.

Here, "substantially not be charged" means "an absolute value of the ζ potential of less than 5 mV".

Further, according to the present invention, there is provided a method of production of the above automobile exhaust gas purification catalyst, the method comprising a step of charging the support mainly comprised of ZrO$_2$ sintered under the above sintering conditions by applying at least one treatment of an acid treatment and a base treatment and a step of dipping the charged state support in the catalyst supporting solution including a colloid of Rh as the catalyst metal to make the Rh colloid be adsorbed on the support.

The present invention treats a support mainly comprised of ZrO$_2$, sintered under sintering conditions whereby the as sintered ZrO$_2$ will substantially not be changed in a catalyst metal supporting treatment solution, by acid treatment and/or base treatment so as to enable Rh to be carried as a catalyst metal in a particle state with a high supporting efficiency. Due to this, it is possible to sinter the support at a high temperature which could not be used in the past due to the difficulty of supporting Rh particles, so it is possible to prevent sintering of the support and the accompanying drop in catalyst activity and obtain the inherently high low temperature activity of Rh.

BEST MODE FOR CARRYING OUT THE INVENTION

[Mechanism of Deterioration of Catalyst Activity Due to Burial of Rh Particles]

In the past, it had been thought that Rh, in the same way as other precious metals, deteriorated in catalyst activity due to sintering of Rh or ions entering solid solution.

As opposed to this, the inventors evaluated the performance by a stoichiometrical air-fuel ratio durability test up to 1000° C. and as a result newly discovered that physical burial of the catalyst metal due to sintering of the support plays a more important role as a deterioration mechanism compared even with sintering or solid solution of a catalyst metal.

Figure 1:
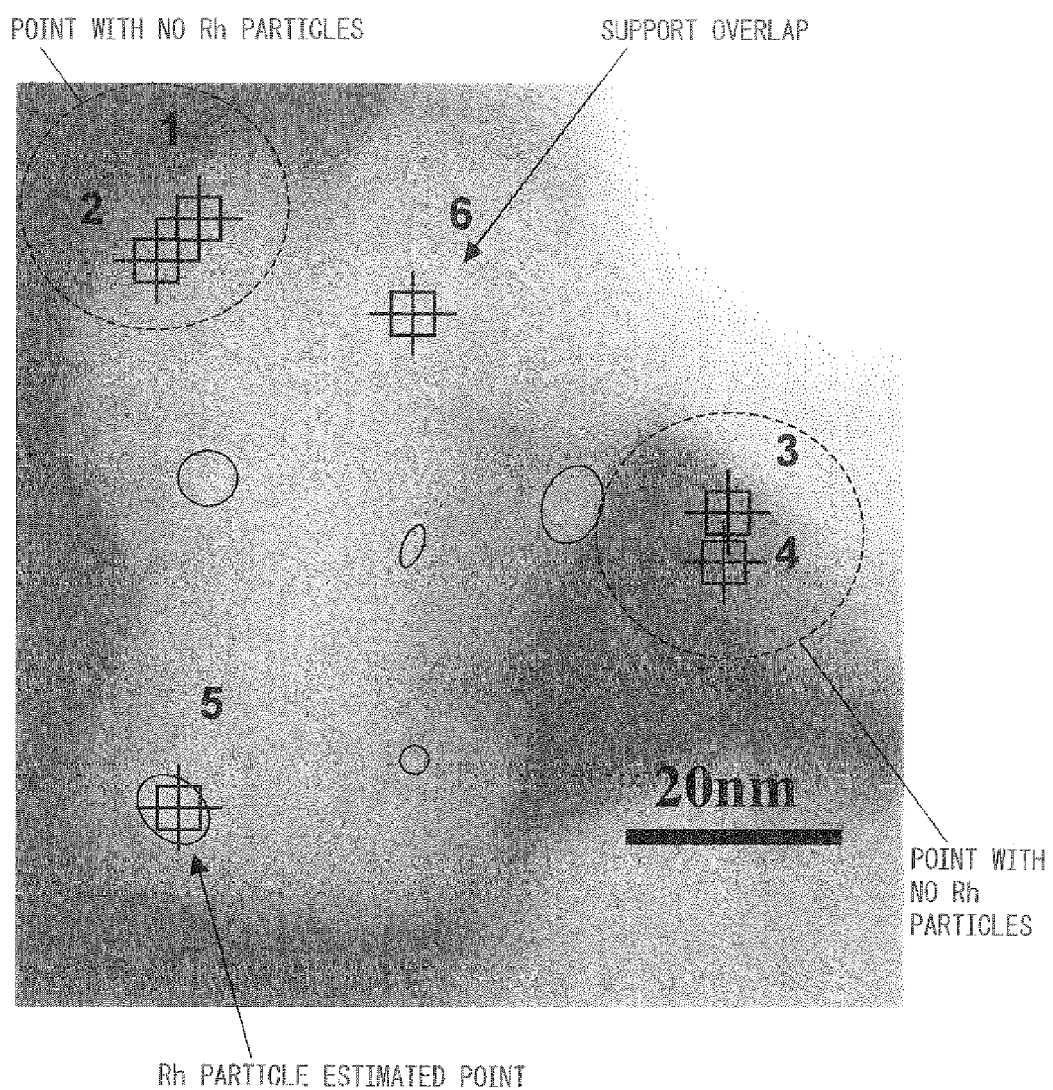
FIG. 1 is an Rh nanoanalysis image by STEM-HAADF of a catalyst comprised of a zirconia support on which Rh particles are supported and confirms the Rh by an EDS detector.

FIG. 1 shows an Rh nanoanalysis image by STEM-HAADF of a catalyst supporting Rh particles on a zirconia support. The catalyst was fabricated by using a commercially available Rh colloid (Rh-PVP (polyvinyl pyrrolidone, Rh particle size of 2 nm) made by Tanaka Precious Metals), diluting this by distilled water of about 10 times the support weight, then adjusting pH to near the neutral point and dipping the zirconia support sintered at 500° C. in the solution to make them support the Rh particles. This catalyst was observed after a durability test at 1000° C., the stoichiometrical air-fuel ratio, and 2 hours. The acceleration voltage was 200V, and the resolution was 2 nm. STEM-EDS, compared with EPMA, has an extremely high analysis ability as shown below:

|  | EDS | EPMA |
|---|---|---|
| Resolution: | 2 nm | Several μm |
| Acceleration voltage | 200 kV | Several 10 kV |
| Detection threshold | Low | High (in particular, for heavy element) |

Further, the analysis values of Zr and Rh at analysis locations 1 to 6 in FIG. 1 are shown in Table 1.

TABLE 1

| Analysis location | EDS analysis value (count) | |
|---|---|---|
|  | Zr—K | Rh—K |
| 1 | 9031 | 483 |
| 2 | 8745 | 53 |
| 3 | 4342 | 624 |
| 4 | 5186 | 79 |
| 5 | 8286 | 3001 |
| 6 | 12166 | 428 |

From the relationship between the analysis strengths of Zr and Rh, it is judged that there were no Rh particles at the analysis locations 1 to 4, Rh particles were exposed at the analysis location 5, and Rh particles were physically buried in the support at the analysis location 6.

Burial of Rh particles occurred in this way probably because under the durability test, the Rh particles were only sintered lightly and were maintained in a fine state, while the support zirconia was remarkably sintered and coarsened resulting in fine Rh particles being buried among coarse zirconia particles.

The Rh particles ending up physically buried in the zirconia support in this way do not function as a catalyst, so the effective amount of Rh with respect to the actual amount of Rh supported is greatly reduced and the catalyst activity is degraded.

In fact, if comparing the above samples between the initial state and the state after the durability tests, the surface area of the zirconia support fell from 95 m²/g to 11 m²/g and the particle size coarsened from 9 nm to 50 nm. On the other hand, if measuring the Rh particle size by the CO adsorption method, it increased from the 1.9 nm of the initial state to 12 nm after the durability tests, but the particle size after the durability tests measured by FE-SEM was 7 nm. From the difference in the particle sizes due to the measurement methods, there is the possibility that about 78% of the Rh particles are buried.

The burial phenomenon of Rh particles has not been known at all up to now. It was first discovered by the inventors. To prevent burial and improve the catalyst activity, it is essential to prevent sintering of the zirconia support. For this, it is necessary to use a zirconia support sintered at a sintering temperature of at least the highest usage temperature under normal operating conditions. In the past, zirconia supports sintered at a high temperature of over the highest usage temperature were how in supporting ability of Rh particles, so evaporation to dryness had to be used for supporting it and therefore the supporting efficiency was low.

In the present invention, the sintering temperature over the highest usage temperature under normal operating conditions is over 900° C. in the case of the catalyst near the exhaust manifold in gasoline cars, over 750° C. in the case of the catalyst under the floor in gasoline cars, and over 700° C. in the case of a catalyst simultaneously reducing the PM and NOx in diesel cars.

[Charging Treatment of High Temperature Sintered Zirconia]

The inventors took note of the fact that the low ability of high temperature sintered zirconia to support Rh particles caused the as sintered zirconia to have a ζ potential of substantially zero in a catalyst metal supporting treatment solution. Further, they discovered that if treating an as sintered zirconia support by at least one of an acid treatment and base treatment, the ζ potential in the catalyst metal supporting treatment remarkably increased and the carrying ability of Rh particles greatly rose. Preferably, acid treatment is performed, then base treatment.

Figure 2:
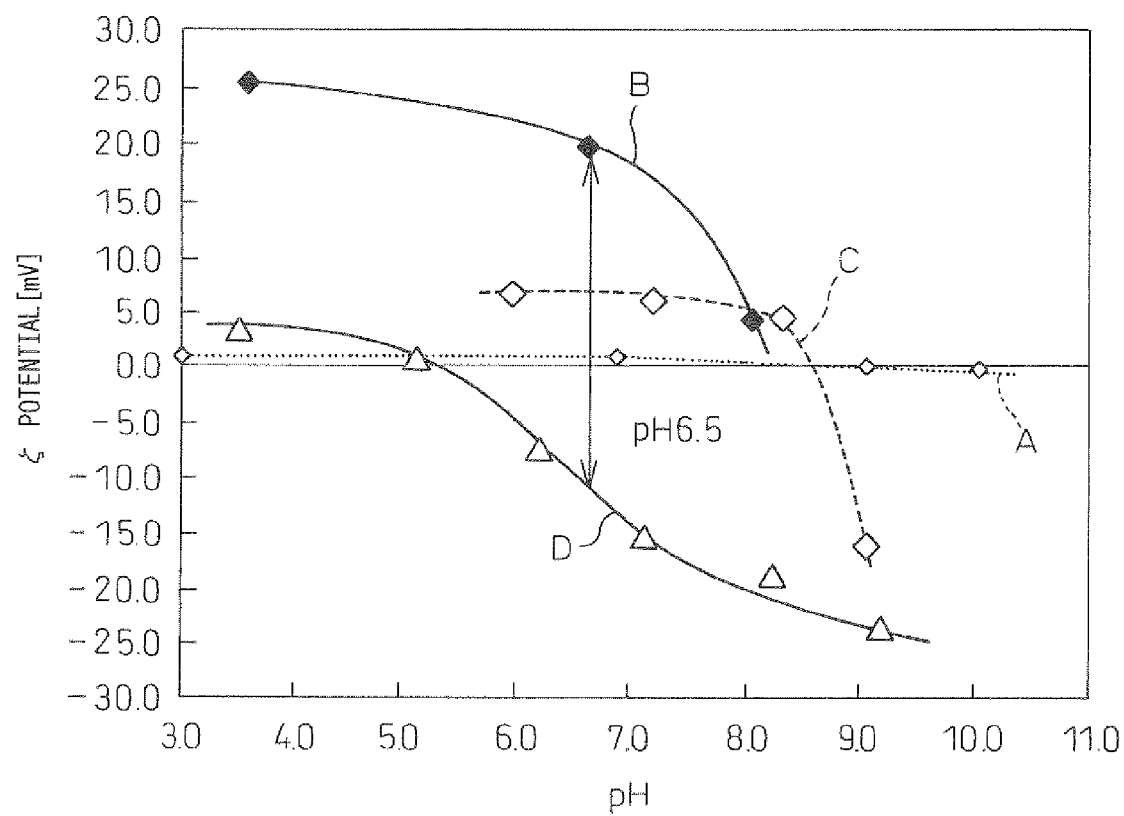
FIG. 2 is a graph showing the changes in the ζ potential when changing the pH of an Rh colloid solution as a catalyst metal supporting treatment solution in various ways for a zirconia support sintered at 900° C., samples treated by an acid+base, and Rh particles themselves in the solution.

FIG. 2 shows the changes in the ζ potential when changing the pH of an Rh colloid solution as a catalyst metal supporting treatment solution in various ways for a zirconia support sintered at 900° C. (A), a sample treated by an acid+base (B and C), and Rh particles themselves (D) in the solution. A commercially available Rh colloid (Rh-PVP (polyvinyl pyrrolidone and Rh particle size of 2 nm) made by Tanaka Precious Metals) was used, was diluted by distilled water about 10 times the weight of the support, then adjusted to various pH values.

The treatment conditions of Samples A, B, and C were as follows:

(A) As sintered at 900° C.
(B) Sintered at 900° C., then treated by acid treatment (HCl (2M), 70° C., 3 h stirring)+base treatment (NH₃ washing)
(C) Sintered at 900° C., then treated by acid treatment (HCl (2M), room temperature, 1 h standing)+base treatment (NH₃ washing)+drying In the experimental range of pH3 to 10, the zirconia support (A) as sintered at 900° C. had a ζ potential remaining substantially 0 regardless of the pH value. The samples treated by acid treatment+base treatment (B and C) differed in absolute values depending on the temperature at the time of the acid treatment, the presence of any stirring, and the presence of any drying after the base treatment, but a trend is recognized where the ζ potential becomes a positive value at the low pH side and fails along with an increase in the pH value to become a negative value at the high pH side. On the other hand, the ζ potential of the copresent Rh colloid (D) is a small positive value at the low pH side. It falls along with an increase in the pH value and becomes a large negative value at the high pH side.

If utilizing this difference in charging behavior of the zirconia support and Rh particles with respect to the pH value, supporting can be promoted by the electrostatic attraction force acting between the two. For example, in the illustrated example, the ζ potential of the sample acid treated at 70° C. for 3 h with stirring and the Rh colloid were large positive and negative values when the pH value was 6.5. A large electrostatic attraction force acts between the two, so it is possible to utilize this to obtain a high supporting ability.

[Rh Particle Size and Purification Performance]

Figure 3:
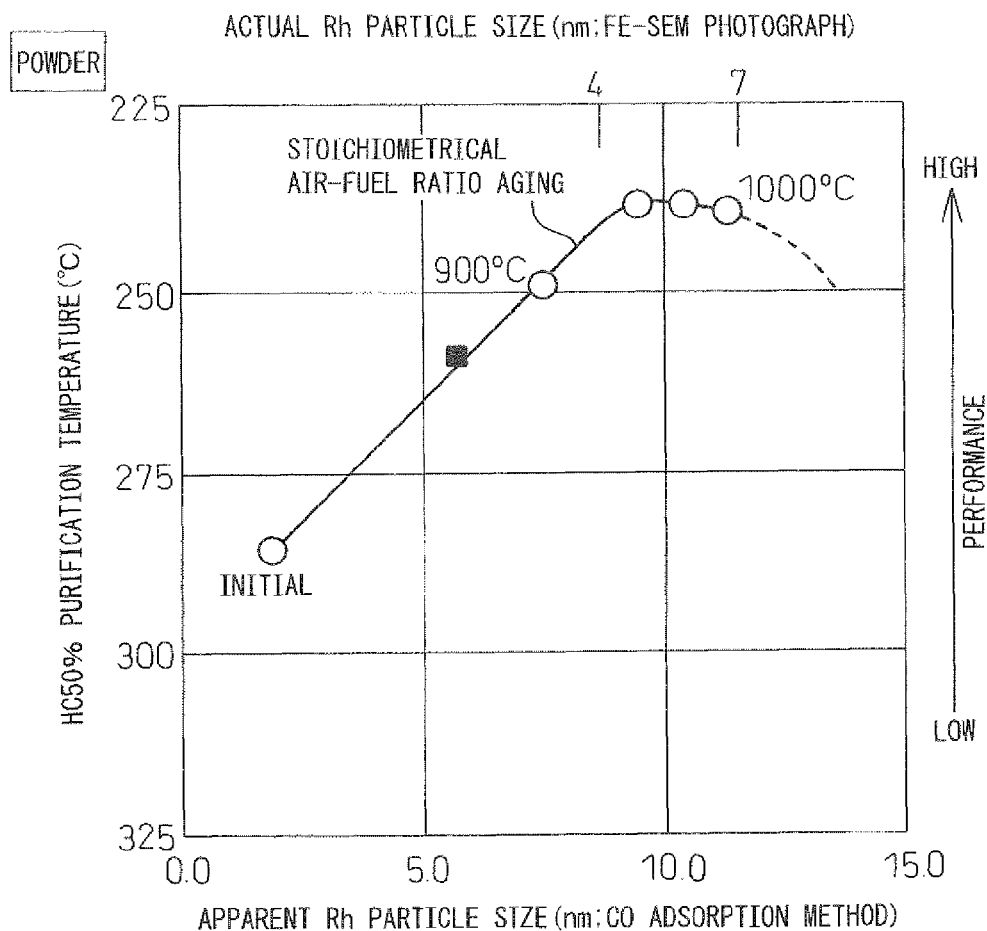
FIG. 3 is a graph showing the relationship between the Rh particle size and the HC50% purification temperature due to the heat treatment temperature in stoichiometrical air-fuel ratio aging for powder state Rh/zirconia catalyst.

FIG. 3 shows the relationship between the Rh particle size and temperature of HC50% purification over a pellet state Rh/zirconia catalyst due to the heat treatment temperature at aging at the stoichiometrical air-fuel ratio. The ordinate plots the heat treatment temperature from the bottom end to the top end from the high temperature to the low temperature. The higher the data plotted on the graph, the higher the purification performance shown (the higher the low temperature activity). The abscissas plot the Rh particle size after aging heat treatment. The bottom abscissa plots the apparent particle size by the CO adsorption method, while the top abscissa plots the actual particle size by an FE-SEM photograph.

In the experiment range, from the smallest end of the Rh particle size (no heat treatment, apparent particle size of about 2 nm) to an apparent particle size of about 9 nm, along with the increase in the particle size, the purification temperature fell. At a higher particle size, the dependence on the particle size substantially disappeared. This is because in the small particle size region, the purification reaction is determined in rate by the change in state of the Rh, while in the large particle size region, the reaction itself determines the speed. If the Rh particle size is small in this way, the purification performance is low. That is, having Rh supported in the state of particles of a certain particle size or more is essential for improvement of the low temperature activity.

Purification of HC is integrally related to purification of NOx due to the following reaction series using HC as a reducing agent in a three-way catalyst reaction mechanism. Therefore, it is possible to use the above HC50% purification temperature to evaluate the three-way catalyst covered for the NOx as well. Note that in the following formula, the "*" indicates the active points on the catalyst metal.

<<NOx Reduction and Decomposition Reaction>>

$$2NO + 2^* \rightarrow 2NO_{ads} \tag{1}$$

$$2NO_{ads} + 2^* \rightarrow 2N_{ads} + 2O_{ads} \tag{2}$$

$$2N_{ads} \rightarrow N_2 + 2^* \tag{3}$$

<<Reduction and Purification of Residual Oxygen>>

The 2 Oads of the above formula (2) reacts as follows with the HC:

2Oads+2/(2m+n/2)·CmHnads

→2m/(2m+n/2)·CO$_2$+n/(2m+n/2)·H$_2$O+2*    (4)

(where m and n are the ratios of composition of C and H of HC)

[Desirable Range of Surface Area of Support]

Figure 4:
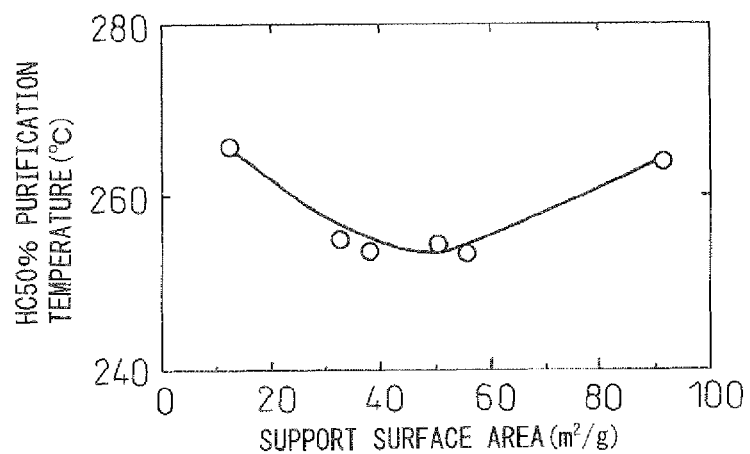
FIG. 4 is a graph showing the relationship between the surface area of a zirconia support of an Rh/zirconia catalyst in the powder state and the HC50% purification temperature after a durability test at 1000° C.

FIG. 4 and Table 2 show the relationship between the surface area of the zirconia support of the powder state Rh/zirconia catalyst and the HC50% purification temperature after a durability test at 1000° C. The zirconia support was treated by an acid, then treated by a base. The treatment conditions were as follows:

Acid treatment conditions: Stirring in a 0.2M HCl aqueous solution for 1 h. After that, filtering, rinsing, and filtering.

Base treatment conditions: Stirring in a 0.1M NH$_4$OH aqueous solution for 1 h. After that, filtering, rinsing, and filtering.

The other preparation conditions were similar to those of the above Example 1. However, the sintering temperature was changed in various ways to change the surface area.

In the experiment range, the HC50% purification temperature was the lowest in the range of the support surface area of 30 m$^2$/g to 60 m$^2$/g. It is learned that the low temperature activity is high.

Therefore, the surface area of the zirconia support used for the catalyst of the present invention is preferably in the above range.

TABLE 2

| Surface area (m$^2$/g) | Sintering temperature (° C. × 3 h) | HC 50 A % purification temperature (° C.) | Rh carrying efficiency (%) |
|---|---|---|---|
| 12.8 (*A) | 1000 | 265.5 | 94.3 |
| 33.0 (*A) | 900 | 254.2 | 100.0 |
| 38.5 (*B) | 950 | 253.5 | Not yet measured |
| 50.7 (*A) | 800 | 254.2 | Not yet measured |
| 55.8 (*B) | 900 | 253.1 | 99.0 |
| 91.8 (*A) | 550 | 263.7 | Not yet measured |

(Not yet measured: However, for carrying liquid transparency, estimated at about 100%)
(*A: calcium stabilized zircornia)
(*B: neodymium-yttrium stabilized zirconia)

EXAMPLES

The following Examples 1, 2, and 3 are specific examples of pretreating a high temperature sintered support mainly comprised of zirconia by the present invention by acid treatment+base treatment, the supporting the Rh colloid. Note that in the following examples, conventional examples, and comparative examples, the "zirconia support" indicates "a support mainly comprised of zirconia". The "mainly comprised of" means that in addition to the main ingredient of the ZrO$_2$, other ingredients and stabilizers can be included to an extent not impairing the properties when supporting ZrO$_2$ alone.

Example 1

<<Acid Treatment and Base Treatment of High Temperature Sintered Zirconia Support>>

A zirconia support sintered at 900° C. was treated in a hydrochloric acid 0.2 mol/L aqueous solution for 1 h with stirring for acid treatment, then was filtered and was rinsed by distilled water for 30 minutes. Next, it was treated in a 0.1 mol/L ammonia aqueous solution for 30 minutes with stirring for a base treatment, then was filtered. Next, it was rinsed for 30 minutes, then filtered.

<<Supporting Rh Colloid>>

A commercially available Rh colloid (Rh-PVP (polyvinyl pyrrolidone, Rh particle size of 2 nm) made by Tanaka Precious Metals) was used, was diluted by distilled water of about 10 times the support weight, then was adjusted in pH to near neutral.

The above treated zirconia support was placed in this colloid solution and stirred for 1 h to make it adsorb and support the Rh colloid particles. After this, the usual method was used to obtain a catalyst supporting Rh particles in a carried amount of 0.3 wt % with respect to the support weight. The Rh supporting efficiency at that time was 99.9%. For the above carried amount, the charged value was used as it is.

Example 2

The same treatment and procedure were used as in Example 1 to make the zirconia support adsorb and support Rh colloid particles. After this, the usual method was used to obtain a catalyst supporting Rh particles in a carried amount of 0.6 wt % with respect to the support weight. The Rh supporting efficiency at that time was 99.3%. For the above supported amount, the charged value was used as it is.

Example 3

The same treatment and procedure were used as in Example 1 to make the zirconia support adsorb and support Rh colloid particles. After this, the usual method was used to obtain a catalyst supporting Rh particles in a carried amount of 1.0 wt % with respect to the support weight. The Rh supporting efficiency at that time was 97.4%. For the above carried amount, the charged value was used as it is.

The following Conventional Examples 1, 2, and 3 are specific examples of impregnating Rh ions on a high temperature sintered zirconia Support without the pretreatment of the present invention.

Conventional Example 1

<<Impregnation of Rh Ions in High Temperature Sintered Zirconia Support>>

A zirconia support sintered at 900° C. was used without ammonia treatment. This was slowly stirred in a Rh chloride aqueous solution warmed to 50° C. for 1 h to make it adsorb the Rh ions. After this, the usual method was used to obtain an impregnated catalyst carrying Rh ions in a supported amount of 0.3 wt % with respect to the support weight. The Rh supporting efficiency at that time was 92.0%. The initial amount was adjusted for use as the supported amount.

Making a zirconia support sintered at a high temperature like 900° C. support Rh is generally very difficult. There are two main reasons. The first is that the high temperature sintering causes the surface area to drop. The second is that acid points and other ion adsorption points are reduced resulting in hydrophobicity. However, this state is governed by the properties of the support (hydrophilicity etc.) and differs by individual case. It is de facto impossible to constantly secure stable supporting ability. In this conventional example, it just happened that supporting Rh was possible, but supporting is not always possible.

Conventional Example 2

The same treatment as in Conventional Example 1 was performed on a zirconia support sintered at 900° C. to make it adsorb Rh ions. After this, the usual method was used to obtain a catalyst supporting Rh ions in a supported amount of 0.6 wt % with respect to the support weight. The Rh supporting efficiency at that time was 85.7%. The initial amount was adjusted for use as the supported amount.

Conventional Example 3

The same treatment as in Conventional Example 1 was performed on a zirconia support sintered at 900° C. to make it adsorb Rh ions. After this, the usual method was used to obtain a catalyst supporting Rh ions in a supported amount of 1.0 wt % with respect to the support weight. The Rh supporting efficiency at that time was 54.5%. The initial amount was adjusted for use as the supported amount.

The following Conventional Example 4 is a specific example of making a high temperature sintered zirconia support supporting an Rh colloid without the pretreatment of the present invention.

Conventional Example 4

<<Supporting of Rh Colloid in High Temperature Sintered Zirconia Support>>

A zirconia support sintered at 900° C. was used as it is. First, in the same way as Example 1, the Rh-PVP colloid solution was added to distilled water and stirred. Next, the zirconia carrier was added and stirred for 3 h. After this, the usual method was used to obtain a catalyst carrying Rh particles in a supported amount of 0.3 wt % with respect to the support weight. The Rh supporting efficiency at that time was 85.2%. The amount of Rh colloid was adjusted for use as the supported amount.

The following Comparative Examples 1, 2, and 3 are specific examples of impregnating a low temperature sintered zirconia support with Rh ions.

Comparative Example 1

<<Impregnation of Rh Ions Into Low Temperature Sintered Zirconia Support>>

A zirconia support sintered at 550° C. was used as it is. This was slowly stirred in a Rh chloride aqueous solution warmed to 50° C. for 1 h to make it adsorb the Rh ions. After this, the usual method was used to obtain an impregnated catalyst supporting Rh ions in a supported amount of 1.0 wt % with respect to the support weight. The Rh supporting efficiency at that time was 97.2%. The initial amount was adjusted for use as the supported amount.

Comparative Example 2

The same treatment as in Comparative Example 1 was performed on a zirconia support sintered at 550° C. to make it adsorb Rh ions. After this, the usual method was used to obtain a catalyst supporting Rh ions in a supported amount of 0.6 wt % with respect to the support weight. The Rh supporting efficiency at that time was 99.4%. The charged amount was used as it is for the supported amount.

Comparative Example 3

The same treatment as in Comparative Example 1 was performed on a zirconia support sintered at 550° C. to make it adsorb Rh ions. After this, the usual method was used to obtain a catalyst supporting Rh ions in a supported amount of 0.3 wt % with respect to the support weight. The Rh supporting efficiency at that time was 99.5%. The charged amount was used as it is for the supported amount.

The catalysts obtained by the above examples, conventional examples, and comparative examples were evaluated for durability. However, Conventional Example 3 had a low Rh supporting efficiency of 54.5% and could not carry the prescribed amount of Rh, so was excluded from the evaluation. The durability test conditions and the evaluation conditions were as follows:

<<Durability Test Conditions>>
1000° C., stoichiometrical air-fuel ratio, 2 h
<<Evaluation Conditions>>
SV: 500,000,000
NOx: 2500 ppm
CO: 6000 ppm
HC: 3000 ppm
$CO_2$: 12%
$H_2O$: 10%
Oxygen Adjusted to Give Stoichiometrical Air-fuel Ratio The highest usage temperatures of a gasoline U/F catalyst and an NOx catalyst (NSR catalyst) are 900° C. or less at the stoichiometrical air-fuel ratio. Therefore, an accelerated durability test was run at 1000° C. at the stoichiometrical air-fuel ratio. These are conditions harsher than actuality in terms of sintering of the Rh particles. A safer side evaluation can be guaranteed. The examples and conventional examples had supported amounts of 0.3 wt % as standard, while the comparative examples had supported amounts of 1 wt % as standard. The results of the evaluation are shown together in Table 3.

TABLE 3

| Class | Zirconia support sintering temperature (° C.) | Supporting solution | Rh supporting amount (wt %) | Supporting efficiency (%) | Rh supporting amount (g/L) | HC50% purification temperature after durability test (° C.) |
|---|---|---|---|---|---|---|
| Ex. 1 | 900 | Rh colloid particles | 0.3 | 99.9 | 0.15 | 281.5 |
| Ex. 2 | 900 | Rh colloid particles | 0.6 | 99.3 | 0.3 | 268.1 |
| Ex. 3 | 900 | Rh colloid particles | 1.0 | 97.4 | 0.5 | 267.2 |
| Conv. Ex. 1 | 900 | Chlorinated Rh aqueous solution | 0.3 | 92.0 | 0.15 | 321.5 |

TABLE 3-continued

| Class | Zirconia support sintering temperature (° C.) | Supporting solution | Rh supporting amount (wt %) | Supporting efficiency (%) | Rh supporting amount (g/L) | HC50% purification temperature after durability test (° C.) |
|---|---|---|---|---|---|---|
| Conv. Ex. 2 | 900 | Chlorinated Rh aqueous solution | 0.6 | 85.7 | 0.3 | 312.3 |
| Conv. Ex. 3 | 900 | Chlorinated Rh aqueous solution | 1.0 | 54.5 | 0.5 | — |
| Conv. Ex. 4 | 900 | Rh colloid particles | 0.3 | 85.2 | 0.15 | 338.2 |
| Comp. Ex. 1 | 550 | Chlorinated Rh aqueous solution | 1.0 | 97.2 | 0.5 | 301.3 |
| Comp. Ex. 2 | 550 | Chlorinated Rh aqueous solution | 0.6 | 99.4 | 0.3 | 322.6 |
| Comp. Ex. 3 | 550 | Chlorinated Rh aqueous solution | 0.3 | 99.5 | 0.15 | 337.3 |

As shown in Table 3, if comparing the warmup ability after a durability test, the catalysts of the examples of the present invention exhibited higher activity compared with even the comparative examples with their larger carried amounts of Rh. Further, the comparative examples fell rapidly in warmup ability together with the drop in the supported amount, while the examples exhibited little drop in warmup ability due to the drop in supported amount.

Further, as shown by the results of Example 3, it is learned that even with a zirconia support sintered at a high temperature, it is possible to support a large amount of Rh and the usable range of the supported amount is broad.

On the other hand, the conventional examples were not able to exceed the warmup ability of Comparative Example 1 (carried amount of 1.0 wt %). This is believed because the ability of the high temperature sintered support to support ions was low, so the dispersion ability of the Rh fell.

In this way, the catalyst of the present invention can support Rh particles with a high dispersion regardless of use of a high temperature sintered zirconia support. The warmup ability with the same supported amount of Rh is greatly improved. The range of the supported amount of Rh able to be used is also broad.

Industrial Applicability

According to the present invention, there are provided an automobile exhaust gas purification catalyst preventing sintering of the support, raising the supporting efficiency, raising the low temperature activity comprised of a support mainly comprised of $ZrO_2$ in which Rh is supported as a catalyst metal and a method of production of the same.

The invention claimed is:

1. A method of production of an automobile exhaust gas purification catalyst, said method comprising:

a step of charging a zirconia support sintered under sintering conditions where the as-sintered zirconia support has an absolute value of zeta potential of less than 5 mV in a catalyst metal supporting treatment solution of a pH 3 to pH 10 by applying at least one treatment of an acid treatment and a base treatment, and a step of dipping said charged state zirconia support in said catalyst metal supporting treatment solution including a colloid of Rh as catalyst metal to make said Rh colloid be adsorbed on said support, wherein said catalyst metal supporting treatment solution has a pH where said zirconia support has a positive zeta potential and the Rh colloid particles have a negative zeta potential.

2. The method of production of an automobile exhaust gas purification as set forth in claim 1, wherein said zirconia support has a surface area of 30 to 60 $m^2/g$.

3. An automobile exhaust gas purification catalyst comprised of a zirconia support, sintered under sintering conditions where the as sintered zirconia support will have an absolute value of zeta potential of less than 5 mV in any catalyst metal supporting treatment solution of a pH3 to pH10 and further treated with at least one of an acid treatment and a base treatment, in which Rh is supported as a catalyst metal in a particle state in a catalyst metal supporting treatment solution of a pH where the zirconia catalyst will become a positive zeta potential and the Rh colloid particles will become a negative one.

4. An automobile exhaust gas purification catalyst as set forth in claim 1, wherein said zirconia support has a surface area of 30 to 60 $m^2/g$.

* * * * *